US009600339B2

(12) United States Patent
Challa et al.

(10) Patent No.: US 9,600,339 B2
(45) Date of Patent: *Mar. 21, 2017

(54) DYNAMIC SHARING OF UNUSED BANDWIDTH CAPACITY OF VIRTUALIZED INPUT/OUTPUT ADAPTERS

(71) Applicant: International Business Machines Corporation, Armonk, NY (US)

(72) Inventors: Narsimha R. Challa, Hyderabad (IN); Adam T. Stallman, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/839,256

(22) Filed: Aug. 28, 2015

(65) Prior Publication Data

US 2016/0203027 A1  Jul. 14, 2016

Related U.S. Application Data

(63) Continuation of application No. 14/594,258, filed on Jan. 12, 2015.

(51) Int. Cl.
*G06F 9/46* (2006.01)
*G06F 9/50* (2006.01)
*G06F 9/455* (2006.01)

(52) U.S. Cl.
CPC ........ *G06F 9/5038* (2013.01); *G06F 9/45558* (2013.01); *G06F 9/5011* (2013.01); *G06F 2009/45579* (2013.01)

(58) Field of Classification Search
CPC .. G06F 9/5038; G06F 9/45558; G06F 9/5011; G06F 2009/45579
USPC ........................................................ 718/104
See application file for complete search history.

(56) References Cited

U.S. PATENT DOCUMENTS

| 8,046,764 | B2* | 10/2011 | Yamakabe | G06F 9/5072 709/226 |
| 8,332,849 | B2 | 12/2012 | Solomon et al. | |
| 8,418,166 | B2* | 4/2013 | Armstrong | G06F 11/20 717/168 |
| 8,468,276 | B2 | 6/2013 | Brownlow et al. | |
| 8,468,535 | B1* | 6/2013 | Keagy | G06F 8/63 718/1 |
| 8,537,706 | B2 | 9/2013 | Cardona et al. | |
| 2005/0039183 | A1* | 2/2005 | Romero | G06F 9/5061 718/100 |

(Continued)

FOREIGN PATENT DOCUMENTS

CN  1786919 A  6/2006

OTHER PUBLICATIONS

List of IBM Patents or Patent Applications Treated As Related.

(Continued)

*Primary Examiner* — Wei Zhen
*Assistant Examiner* — Lanny Ung
(74) *Attorney, Agent, or Firm* — Middleton Reutlinger

(57) ABSTRACT

A method utilizes priority-based bandwidth allocation to reallocate unused bandwidth capacity of a virtualized IO resource such as a self-virtualizing IO resource to one or more virtual functions in an allocation pool based upon priorities assigned to such virtual functions.

18 Claims, 7 Drawing Sheets

(56) References Cited

U.S. PATENT DOCUMENTS

| | | | |
|---|---|---|---|
| 2006/0136761 A1* | 6/2006 | Frasier | G06F 9/505 |
| | | | 713/320 |
| 2010/0268816 A1 | 10/2010 | Tarui et al. | |
| 2012/0180048 A1 | 7/2012 | Brownlow et al. | |
| 2012/0272243 A1* | 10/2012 | Nolterieke | G06F 9/45558 |
| | | | 718/1 |
| 2013/0254767 A1 | 9/2013 | Mizuno et al. | |
| 2013/0339955 A1* | 12/2013 | Prawer | G06F 9/45533 |
| | | | 718/1 |
| 2014/0007097 A1* | 1/2014 | Chin | G06F 9/45533 |
| | | | 718/1 |
| 2014/0165060 A1* | 6/2014 | Muller | G06F 9/45533 |
| | | | 718/1 |
| 2014/0325522 A1 | 10/2014 | Li et al. | |

OTHER PUBLICATIONS

Dong, Yaozu et al., "SR-IOV Networking in Xen: Architecture, Design and Implementation," Workshop on I/O Virtualization, 2008, 7 pages.

Dong, Yaozu et al., "High Performance Network Virtualization with SR-IOV," Journal of Parallel and Distributed Computing 72, No. 11, 2012, pp. 1471-1480.

"Oracle VM VirtualBox User Manual, Chapter 6", Oracle Corporation, downloaded from http://www.virtualbox.org/manual/ch06.html on Dec. 9, 2014.

U.S. Patent and Trademark Office, Office Action issued in related U.S. Appl. No. 14/594,258 dated Apr. 12, 2016.

U.S. Patent and Trademark Office, Notice of Allowance issued in related U.S. Appl. No. 14/594,258 dated Aug. 26, 2016.

* cited by examiner

DYNAMIC SHARING OF UNUSED BANDWIDTH CAPACITY OF VIRTUALIZED INPUT/OUTPUT ADAPTERS

CROSS-REFERENCE TO RELATED APPLICATIONS

This application is a continuation of U.S. patent application Ser. No. 14/594,258, filed on Jan. 12, 2015 by Narsimha R. Challa et al., and entitled DYNAMIC SHARING OF UNUSED BANDWIDTH CAPACITY OF VIRTUALIZED INPUT/OUTPUT ADAPTERS, the entire disclosure of which is incorporated by reference herein.

FIELD OF THE INVENTION

The invention is generally related to data processing, and in particular to logically partitioned data processing systems and self-virtualizing input/output devices for use with same.

BACKGROUND OF THE INVENTION

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own VM, with each VM allocated a part of a physical processor, an entire physical processor, or multiple physical processors from the computer. Additionally, a portion of the computer's memory is allocated to each VM. An underlying partition manager, often referred to as a hypervisor or virtual machine monitor (VMM), manages and controls the VMs. The hypervisor is typically a part of the system firmware and manages the allocation of resources to the operating systems and VMs. As such, one logically partitioned computer may run one or more VMs and thus virtualize the operations of the applications, operating systems, and other program code configured to operate in those logical partitions.

In addition to sharing the physical processors and memory in a logically partitioned computer, VMs also typically share other types of physical hardware resources, which are collectively referred to herein as input/output (IO) resources. For example, in order to provide VMs with access to external networks, logically partitioned computers typically include multiple physical network adapters, e.g., network interface cards (NICs), that are shared by the VMs, such that each VM is allocated at least a part of one or more physical network adapters to enable that VM to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fibre Channel over Ethernet (FCoE), etc. An IO resource that is shared by multiple VMs may be considered to be a virtualized IO resource within the context of the present disclosure.

In many conventional logically partitioned computers, IO resources are virtualized within the hypervisor, so that conventional device drivers, appropriate for use in both logically partitioned and non-partitioned computers, may be used. Virtualization of an IO resource in a hypervisor typically requires that the hypervisor trap device accesses by the device drivers in the VMs and effectively route the operations to the appropriate physical IO resources. Thus, where multiple VMs share a common physical IO resource, the hypervisor itself handles the multiplexing of operations performed by the physical IO resource on behalf of each VM. Allocating such higher-level functionality to a hypervisor, however, has been found to introduce excessive complexity and processing overhead to the hypervisor. It is desirable in many implementations for a hypervisor to be as small, compact, fast and secure as possible so that the processing overhead of the hypervisor is minimized. As such, other technologies have been introduced in an attempt to off-load the responsibility of virtualizing IO resources from the hypervisor.

For example, in some designs, a dedicated VM, referred to as a virtual input/output server (VIOS), may be used to manage the virtualization of IO resources. While the use of a VIOS offloads higher-level functions from the hypervisor and reduces the overall complexity of the hypervisor, it has been found that using VMs to provide such services to other VMs requires relatively high overhead to instantiate and run the VM, and thus, a full operating system, in order to provide such services.

More recently, some designs have relied upon adjunct partitions (APs), which have also been referred to as partition adjuncts, to assist with the virtualization of IO resources. An AP is a type of partition that is more limited than a full, logical partition or virtual machine. An AP typically runs in a flat, static effective address space and problem state, which permits the hypervisor to apply a range of hypervisor and processor optimizations that result in a substantial decrease in system overhead associated with a context switch of the state machine from an VM to state data of an AP, that is, compared to a context switch of the state machine between two VMs. In other respects, an AP is similar to a full VM. For example, an AP typically can be assigned resources, either physical or virtual, similar to a full VM. Further, an AP can be an end-point of a virtual input output (VIO) communications mechanism, similar to a full VM, such as VIOS.

In addition, some designs have incorporated the concept of self-virtualization of IO resources, where at least a portion of the virtualization of a physical IO resource is handled within the resource itself. The PCI single root input/output virtualization (SRIOV) specification, for example, enables a physical IO resource such as a NIC to incorporate replicated on-board functionality such as memory spaces, work queues, interrupts, and command processing so that a single function such as a single Ethernet connection can be presented to a logically partitioned computer as multiple and separate physical functions. The SRIOV specification introduces the concepts of physical functions (PFs) and virtual functions (VFs), with the former representing full PCI functions and having the ability to instantiate, configure and manage virtual functions, and the latter representing lightweight PCI functions with reduced configuration resources and usable by VMs to access a self-virtualizing device.

It has been found that the use of APs in conjunction with self-virtualizing IO resources provides a flexible, efficient framework with which to virtualize IO resources in a logically partitioned computer, and does so without requiring a separate full VM to provide the virtualization, and without requiring such functionality to be embedded within client VMs or in the hypervisor.

In some designs, virtual functions are allocated fixed bandwidth resources from a physical function of a self-virtualizing IO resource based on user provided capacity or QoS (Quality of Service) settings, with the resources allocated to a virtual function fixed and dedicated to that virtual function throughout the virtual function's lifetime. In practice, however, the allocation of resources to virtual functions may not be optimal as users may not be aware of application characteristics such as bandwidth requirements, and as an allocation that may be optimal at one point in time may not be optimal at another point in time due to changing workloads. As a result, over a period of time it can be observed that some virtual functions may end up being over-utilized (e.g., due to insufficient IO bandwidth and/or adapter resources) while some virtual functions may end up being under-utilized. Also, in other scenarios a self-virtualizing IO resource may be left with some amount of unused and/or unallocated IO resources of which a user may not be aware.

Therefore, a need continues to exist in the art for a manner of optimizing bandwidth allocation among virtual functions in a logically-partitioned computer.

SUMMARY OF THE INVENTION

The invention addresses these and other problems associated with the prior art by providing a method that utilizes priority-based bandwidth allocation to reallocate unused bandwidth capacity of a virtualized IO resource such as a self-virtualizing IO resource to one or more virtual functions in an allocation pool based upon priorities assigned to such virtual functions.

Therefore, consistent with one aspect of the invention, shared bandwidth of a virtualized IO resource in a logically-partitioned computer is shared by determining unused bandwidth capacity for an allocation pool that includes a plurality of virtual functions, where each of the plurality of virtual functions includes a priority associated therewith, and reallocating the unused bandwidth capacity to at least one of the plurality of virtual functions in the allocation pool as additional bandwidth capacity based upon the priority associated with the at least one of the plurality of virtual functions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
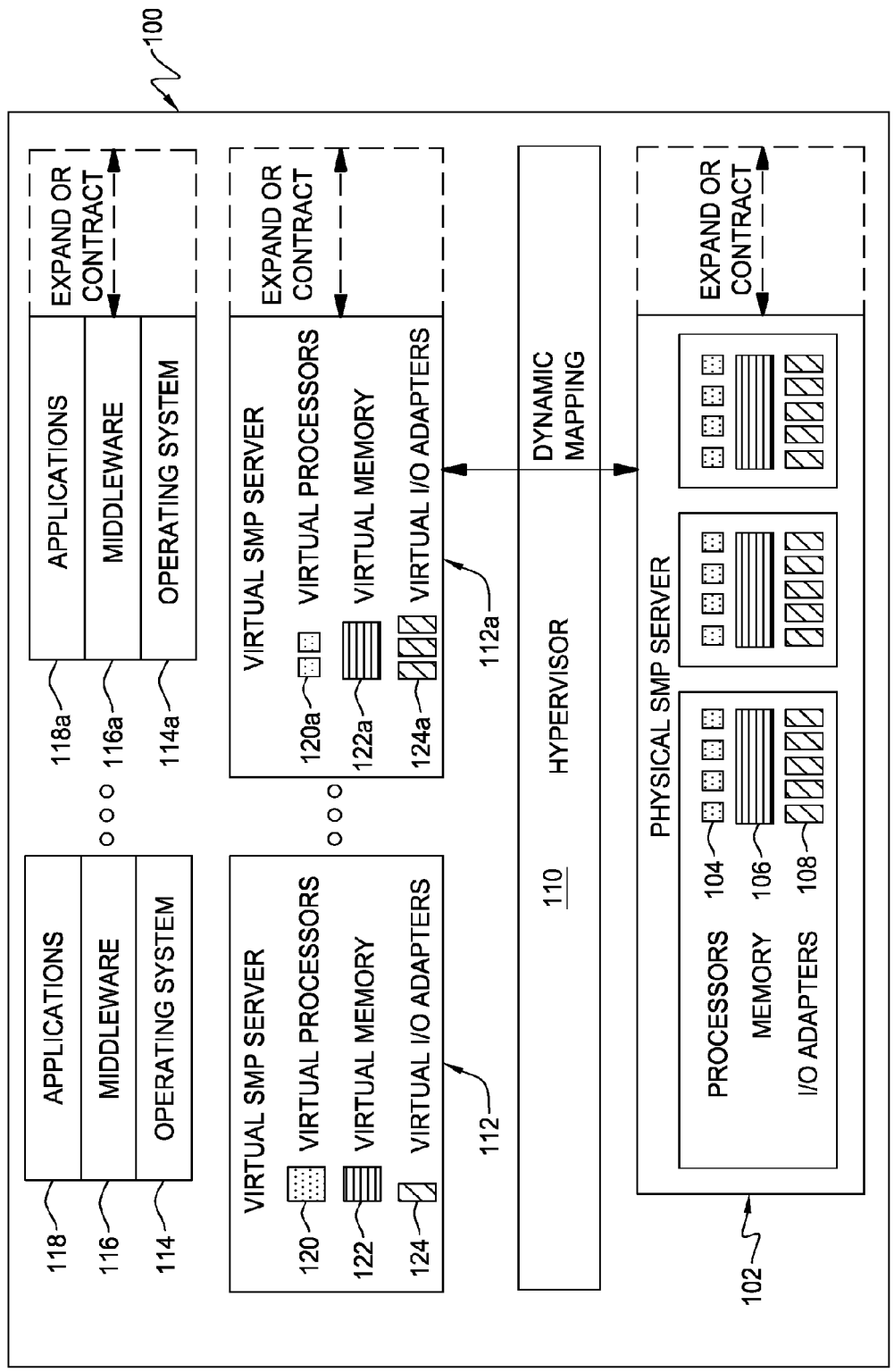
FIG. 1 is a block diagram of one embodiment of a data processing system configured to implement one or more aspects of the present invention.

Embodiments consistent with the invention dynamically optimize the use of IO adapter resources by intelligently sharing unused IO bandwidth of virtualized IO resources such as SRIOV adapters based upon priorities assigned to one or more virtual functions in order to increase or otherwise improve the utilization of the bandwidth of IO resources accessed by a virtualization platform.

In particular, embodiments consistent with the invention may utilize a priority-based bandwidth allocation technique to reallocate unused bandwidth capacity of a virtualized IO resource such as an SRIOV adapter or other self-virtualizing IO resource to one or more virtual functions in an allocation pool based upon priorities assigned to such virtual functions.

Unused bandwidth capacity, in this regard, may be considered to include one or both of bandwidth capacity that is unallocated and bandwidth capacity that is allocated but not being actively used. Unallocated bandwidth capacity, for example, may represent bandwidth capacity of a virtualized IO resource that is not currently allocated to any particular virtual function or other system entity. Allocated but not being actively used bandwidth capacity, in contrast, may refer to bandwidth capacity that is allocated to a virtual function or other system entity, but that is not being actively used, e.g., due to a virtual function or other system entity to which the bandwidth capacity is allocated being inactive. In some embodiments, for example, bandwidth capacity allocated to a virtual function may be considered to be not actively used when the virtual machine with which the virtual function is associated is currently inactive.

In addition, as will become more apparent below, priority-based bandwidth allocation may be based on priorities assigned to one or more virtual functions, as well as on priorities assigned to virtual machines with which such virtual functions may be associated. Priorities may also be defined for different allocation pools and/or at different hierarchical levels, each within allocation pools associated with physical functions or virtualized IO resources. Varying levels of priorities may be used, and priorities may be configurable by a user in some embodiments to permit a user to prioritize certain virtual functions and/or virtual machines relative to others.

Therefore, in some embodiments, shared bandwidth of a virtualized input/output (IO) resource may be shared in a logically-partitioned computer by determining unused bandwidth capacity for an allocation pool that includes a plurality of virtual functions, where each of the plurality of virtual functions includes a priority associated therewith, and, using at least one physical processor, reallocating the unused bandwidth capacity to at least one of the plurality of virtual functions in the allocation pool as additional bandwidth capacity based upon the priority associated with the at least one of the plurality of virtual functions. In some embodiments, the unused bandwidth capacity includes unallocated bandwidth capacity and allocated but not being actively used bandwidth capacity. In addition, in some embodiments, determining the unused bandwidth capacity for the allocation pool includes monitoring bandwidth capacity allocated and actively being used by virtual functions in the allocation pool, monitoring bandwidth capacity allocated but not being actively used by virtual functions in the allocation pool, and monitoring unallocated bandwidth capacity for the allocation pool.

In some embodiments, monitoring bandwidth capacity allocated but not being actively used by virtual functions in the allocation pool includes determining bandwidth capacity allocated to virtual functions associated with inactive virtual machines. In addition, in some embodiments, reallocating the unused bandwidth capacity to the least one virtual function includes assigning the unused bandwidth capacity to virtual functions in decreasing order of priority starting with a highest priority virtual function first from the unallocated bandwidth capacity and second from the bandwidth capacity allocated but not being actively used by virtual functions in the allocation pool.

Moreover, in some embodiments, the allocation pool is associated with a physical function of the virtualized IO resource, the plurality of virtual functions are contained by the physical function, and reallocating the unused bandwidth capacity includes sharing the unused bandwidth capacity of the physical function between at least two virtual functions contained by the physical function. In some embodiments, the allocation pool is associated with the virtualized IO resource, the virtualized IO resource includes a virtual Ethernet bridge (VEB), the plurality of virtual functions are of the virtualized IO resource, and reallocating the unused bandwidth capacity includes sharing the unused bandwidth capacity of the virtualized IO resource between at least two virtual functions of the virtualized IO resource using the VEB.

In some embodiments, the priority associated with the at least one virtual function is defined by a virtual machine priority attribute for a virtual machine with which the at least one virtual function is associated, the virtual machine priority attribute being user configurable and applicable to all virtual functions for the virtual machine. In some embodiments, the priority associated with the at least one virtual function is defined by a priority in physical function attribute, the priority in physical function attribute being user configurable to prioritize the at least one virtual function relative to other virtual functions contained by the same physical function in the virtualized IO resource. Also, in some embodiments, the priority associated with the at least one virtual function is defined by a priority in IO resource attribute, the priority in IO resource attribute being user configurable to prioritize the at least one virtual function relative to other virtual functions of the virtualized IO resource.

Some embodiments additionally include updating an additional capacity used attribute for the at least one virtual function to track an amount of additional capacity reallocated to the at least one virtual function. Some embodiments also include, in response to a request to create a new virtual function when insufficient unallocated bandwidth is available for the virtualized IO resource, reclaiming reallocated unused bandwidth capacity from virtual functions in the allocation pool in increasing order of priority starting with a lowest priority virtual function to which unused bandwidth capacity has been reallocated.

In some embodiments, reallocating the unused bandwidth capacity to the at least one virtual function includes determining whether an allocate unused bandwidth flag is set for the at least one virtual function or a virtual machine with which the at least one virtual function is associated. In some embodiments, reallocating the unused bandwidth capacity to the at least one virtual function is performed in response to creation or deletion of a virtual function in the allocation pool. Also, in some embodiments, reallocating the unused bandwidth capacity to the at least one virtual function is performed in response to changing a priority of at least one virtual function in the allocation pool, while in some embodiments, reallocating the unused bandwidth capacity to the at least one virtual function is performed in response to moving at least one virtual function in the allocation pool between virtual machines. In some embodiments, reallocating the unused bandwidth capacity to the at least one virtual function is performed by a hypervisor or an adjunct partition, and in some embodiments, the virtualized IO resource comprises a single root input output virtualization (SRIOV) adapter.

It will be appreciated that other modifications and variations to the herein-described embodiments may be made consistent with the invention. Therefore, the invention is not limited to the particular implementations disclosed herein.

Hardware and Software Environment

Now turning to the Drawings, wherein like numbers denote like parts throughout the several views, FIG. 1 is a block diagram of a data processing system or computer 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and IO adapters 108. These physical devices are managed by hypervisor 110, which may also be referred to as a partition manager, virtual machine monitor or PHYP. Processors 104 are shared processors and each may be a simultaneous multithreading (SMT)-capable processor that is capable of concurrently executing multiple different threads on the processor.

A virtual server, or logical partition, is a proxy for a physical server that has the same capabilities, interfaces, and state. Virtual servers 112 are created and managed by a hypervisor 110 that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and IO adapter(s) that are available for the exclusive use of that virtual server. For example, virtual server 112 includes virtual processors 120, virtual memory 122, and virtual IO adapters 124. Virtual server 112a includes virtual processors 120a, virtual memory 122a, and virtual IO adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual IO adapters that are defined for each virtual server are logical substitutes for physical processors, memory, and IO adapters.

Hypervisor 110 manages the mapping between the virtual servers with their virtual processors, virtual memory, and virtual IO adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers or logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual IO adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual servers for situations where sharing is not desired. Hypervisor 110 is responsible for managing the addition or removal of physical resources. Hypervisor 110 makes these additions and deletions transparent to the upper level applications.

Figure 2:
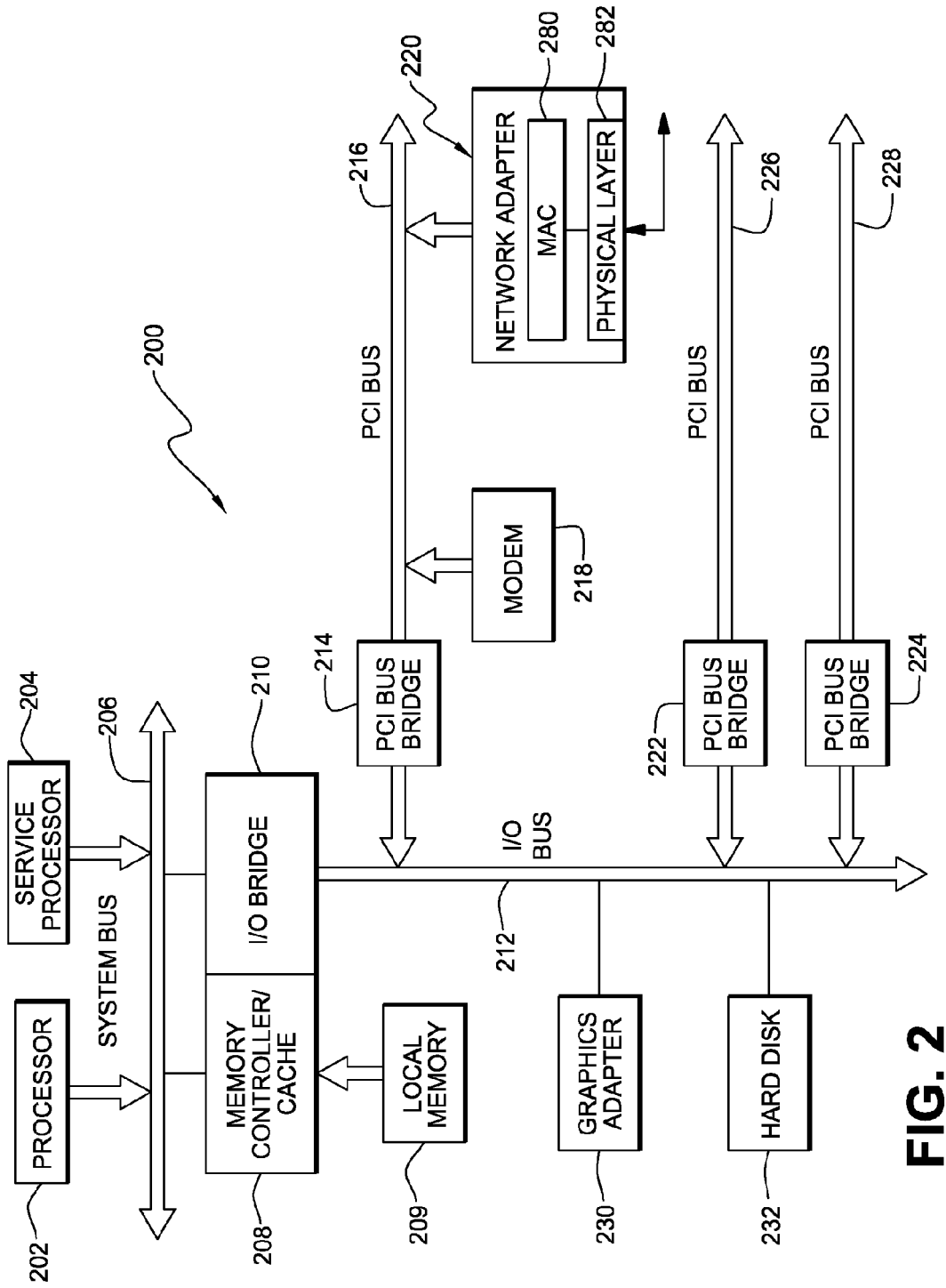
FIG. 2 is a more detailed illustration of a data processing system that may be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor. Each processor 202 may be considered to be a physical processor.

Also connected to system bus 206 is memory controller/cache 208, which provides an interface to local memory 209. IO bus bridge 210 is connected to system bus 206 and provides an interface to IO bus 212. Memory controller/cache 208 and IO bus bridge 210 may be integrated as depicted.

Peripheral component interconnect (PCI) bus bridge 214 connected to IO bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an RJ45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to IO bus 212 as depicted, either directly or indirectly.

Service processor 204 interrogates system processors, memory components, and IO bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and IO bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a data processing system implementing the functionality disclosed herein may be built upon technologies found in the IBM Power E880 system and the PowerVM virtualization platform available from International Business Machines Corporation.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1-2 is not intended to limit the present invention. Indeed, those skilled in the art will recognize that other alternative hardware and/or software environments may be used without departing from the scope of the invention.

Adjunct Partitions and Self-Virtualizing IO Resources

Embodiments consistent with the invention may utilize adjunct partitions, or partition adjuncts, which are partitions that are more limited than full, logical partitions. As described below, the adjunct partition runs in a flat, static effective address space and problem state. These restrictions permit the hypervisor to apply a range of hypervisor and processor optimizations that result in a substantial decrease in system overhead associated with a context switch of the state machine from a logical partition to state data of an adjunct partition, that is, compared to a context switch of the state machine between logical partitions. In other respects, an adjunct partition is similar to a full logical partition. For example, an adjunct partition can be assigned resources, either physical or virtual, similar to a full logical partition. Further, an adjunct partition can be an end-point of a virtual input output (VIO) communications mechanism, similar to a full logical partition, such as a virtual input output server (VIOS).

Figure 3:
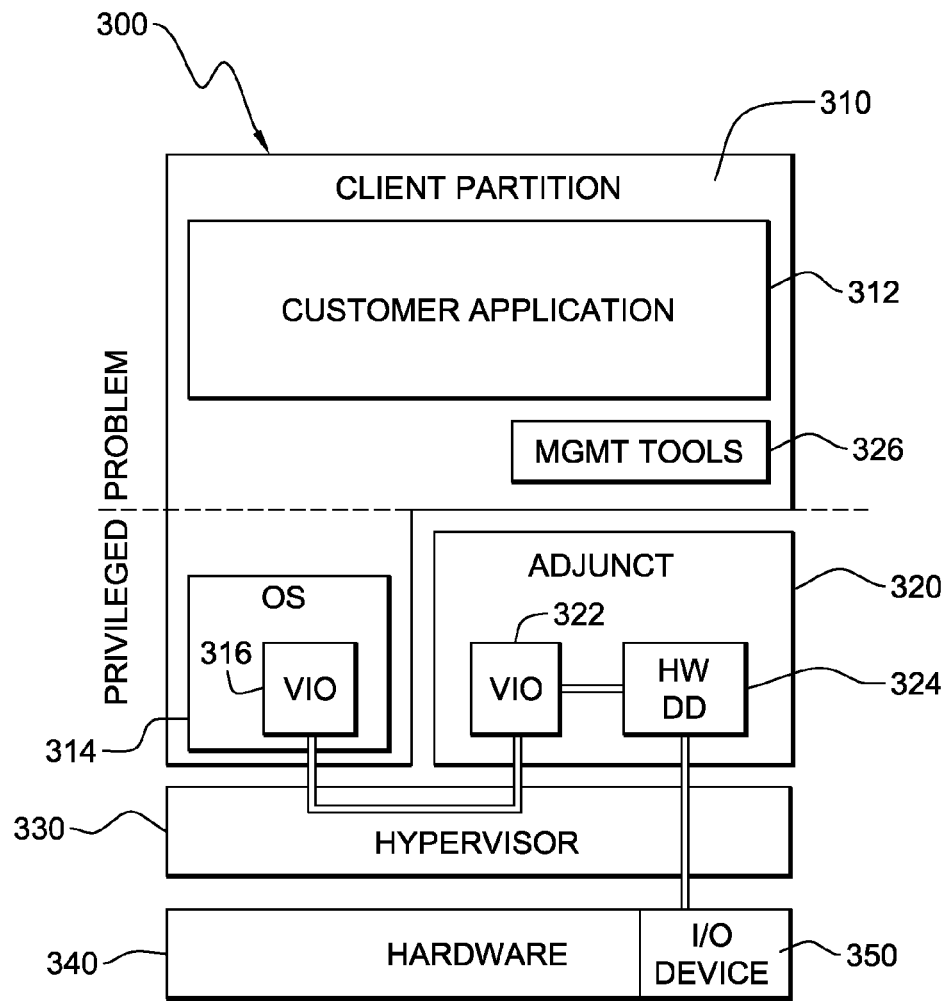
FIG. 3 illustrates one embodiment of a data processing system comprising a client logical partition and an adjunct partition, in accordance with an aspect of the present invention.

FIG. 3 illustrates one example of a data processing system 300, comprising a client logical partition (or simply client partition) 310 and an adjunct partition 320, in accordance with an aspect of the present invention. Client partition 310 is a logical partition which comprises one or more customer applications 312, an operating system instance 314 and a virtual IO facility 316. Client partition 310 runs atop a hypervisor 330, and provides higher-level function than that provided by the hypervisor itself. Hypervisor 330 executes atop the underlying system hardware 340, which is shown to include one or more IO devices 350.

Adjunct partition 320 is conceptually a child partition to client partition 310. The adjunct partition is less than a full logical partition, but is run in a manner whereby the hypervisor enforces security and isolation between the adjunct partition and the client partition it runs within. The adjunct partition is provided with reduced functionality compared with a full logical partition, for example, has no access to memory management unit (MMU) configuration or floating-point facilities, and is an environment that only the functionality needed to run the desired service (e.g., IO driver) is provided. In the illustrated example, adjunct partition 320 includes a virtual IO interface 322 and a hardware device driver service 324, which allows access to IO device 350. In operation, client partition 310 accesses IO device 350 via the adjunct partition 320, as illustrated. By reducing functionality within the adjunct partition environment, the run time overhead of dispatching and maintaining the adjunct partition (compared with another full logical partition) is reduced, and consequently, many of the performance disadvantages of using a separate logical partition as a virtual input output server (VIOS) are avoided.

As a specific example, the adjunct partition is described herein as running a reduced operating system environment for a device driver service. This service is provided by way of example only. The adjunct partition provides minimal, optimized, infrastructure comprising only (in one example) the structure needed by a device driver. For instance, if a Linux device driver is to run inside of the adjunct partition, then the minimal execution environment includes only the Linux kernel services or equivalent services, that the Linux device driver requires. If an AIX device driver is to run inside of the adjunct partition, then the minimal execution environment includes only the AIX kernel services, or equivalent services, that the AIX device driver requires. Advantageously, the adjunct partition runs in hypervisor/problem-state, directly against hypervisor interfaces. As explained in detail below, dispatching of the adjunct partition does not require a full partition context switch, which simplifies adjunct kernel requirements. This is achieved, in part, by mapping the adjunct partition into the client partition's virtual address page table. Client partition to adjunct partition isolation can be achieved, for example, via hypervisor-managed memory keys. Advantageously, the adjunct partition is not customer viewable. Further, the same adjunct partition service (referred to herein as a global adjunct partition service) may be instantiated within multiple client partitions, as explained below.

Various adjunct partition usage models can be implemented in accordance with the concepts disclosed herein for addressing a number of operating system and platform issues. One example is a local adjunct partition, which conceptually partially resides within an initiating client partition for accessing dedicated resources through a hypervisor. For example, a common adapter/driver service may be provided by adjunct partition for a respective dedicated adapter (i.e., resource).

As another alternative, a global adjunct partition may be used, wherein a service logical partition such as a virtual input output server partition donates memory and physical resources for instantiation of the adjunct partition. Such a global adjunct partition may be accessible or attachable by multiple client partitions, and may provide, for example, input output services to a resource via a hypervisor. As a specific example, the global adjunct partition may comprise a common adapter driver service, and the resource a shared adapter. Yet another embodiment of a global adjunct partition may rely on a hypervisor to provide resources for the adjunct. In this implementation, the hypervisor employs the adjunct partition for its own use, for example, for protection or isolation services that would otherwise exist in the hypervisor's execution domain.

In the illustrated embodiments, in order for an adjunct partition to be a runable program, the hypervisor, along with a client partition that is to use the adjunct partition service, negotiate to establish the adjunct partition environment. Once this negotiation is complete, the client partition will have donated a portion of its virtual address space to the hypervisor for use by the adjunct partition. The hypervisor will use hardware and hypervisor facilities to ensure that the client partition no longer has access to or can modify the donated resources (e.g., the donated virtual address space). The hypervisor instantiates the effective address mappings required to run the adjunct partition using the donated virtual address resources. Subsequently, the hypervisor may switch between dispatching the client partition or the adjunct partition by reprogramming its control of the donated virtual address space. When the client partition runs, it may access all virtual address space assigned to it, except for the donated virtual address range, and when the adjunct partition runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the adjunct partition address space is carved out of and separated from the memory management and address translation hardware resources of the client partition. The adjunct partition is thus, from a processor's perspective, part of the client partition, but from the client partition's and hypervisor's perspective, is a distinct entity.

Advantageously, the adjunct partition concepts presented herein reduce the need to use full logical partitions for providing services to client partitions. This in turn frees up resources and improves performance for customer workloads. Additionally, the adjunct partition disclosed herein encourages the development and deployment of virtual platform services in lieu of development of operating system specific services by reducing the performance penalties associated with virtualized services. This in turn allows for savings and cost development, since services may be implemented only once (i.e., in an adjunct partition), rather than natively among multiple operating systems.

Additional details regarding adjunct partitions, their configuration and use, and the various modifications that may be implemented in adjunct partitions consistent with the invention, may be found, for example, in U.S. Pat. No. 8,645,974 to Armstrong et al., as well as U.S. Pat. No. 8,537,706 to Cardona et al., each of which is incorporated by reference in its entirety.

Multiple adjunct partitions may also be employed to provide multiple logical partitions with access to, for example, a self-virtualizing input/output device, such as a self-virtualizing input/output adapter. In a virtualized system, if a single input/output adapter is present, and that adapter is to service multiple logical partitions of the data processing system, then input/output virtualization (IOV) capabilities of the input/output device, if present, may be employed to instantiate multiple virtual functions (VF), each of which appears as an input/output adapter to a respective client logical partition. One example of a self-virtualizing input/output device is the single root input/output virtualized hardware described, for example, in "Single Root I/O Virtualization and Sharing Specification", Revision 1.0, PCI-SIG (Sep. 11, 2007), which is incorporated herein by reference in its entirety.

Adjunct partition instances may be deployed in a manner wherein each adjunct partition instance is created to support a particular logical partition to virtual function (or queue pair) pairing. Using this approach, each logical partition accesses a corresponding virtual function or queue pair employing abstract virtual input/output mechanisms. From the point of view of the client partition, this functionality is similar (or equivalent) to a VIOS implementation. However, the disadvantages of such a system are avoided since each logical partition to virtual function (or queue pair) association has a unique adjunct partition instance facilitating communication therebetween. Since each adjunct partition instance handles only a single logical partition and a single virtual function (or queue pair) it is not necessary to include locks or synchronization mechanisms otherwise needed to support multiplexing of the IO adapter, since the system relies on the multiplexing capabilities within the self-virtualizing input/output capable device itself.

Another advantage of this adjunct partition implementation is that, since all adjunct partition instances may be considered for the same device, they are able to share code and read only data, which substantially reduces the memory foot-print required to support the implementation, with the memory foot-print cost of adding an adjunct partition instance being simply the cost associated with maintaining dynamic state information for the logical partition to virtual function (or queue pair) pairing for the new adjunct partition instance.

Further, adjunct partition instances, since they may be configured to support only one logical partition to virtual function (or queue pair) pairing at a time, may be readily written in a manner to avoid many of the synchronization and locking mechanisms required by traditional IO stacks and drivers, both in native device drivers and VIOS-based implementations. For example, adjunct partitions may be written as polling state machines, and the dedicated nature of their runtime environment precludes the need to support active preemption, thus simplifying or eliminating the need for locking.

To summarize, the use of adjunct partitions in the manner described herein permits logical partitions to obtain IO services from input/output virtualization-capable, input/output devices or adapters in a manner that minimizes the device-driver development required for each operating system of the logical partition, since the operating systems only see virtual input/output (VIO) services (e.g., device driver services), not specific physical input/output adapter devices. This avoids the need to instantiate a logical partition to multiplex the underlying IO hardware, and permits the multiplexing of IO hardware to be accomplished via efficient VIO hardware capabilities, rather than software locks in a VIOS. This last aspect is a property that arises from the unique programming model of an adjunct partition, and assumes that a particular adjunct partition implementation used to support a particular IO device makes use of these properties to create an efficient implementation.

Figure 4:
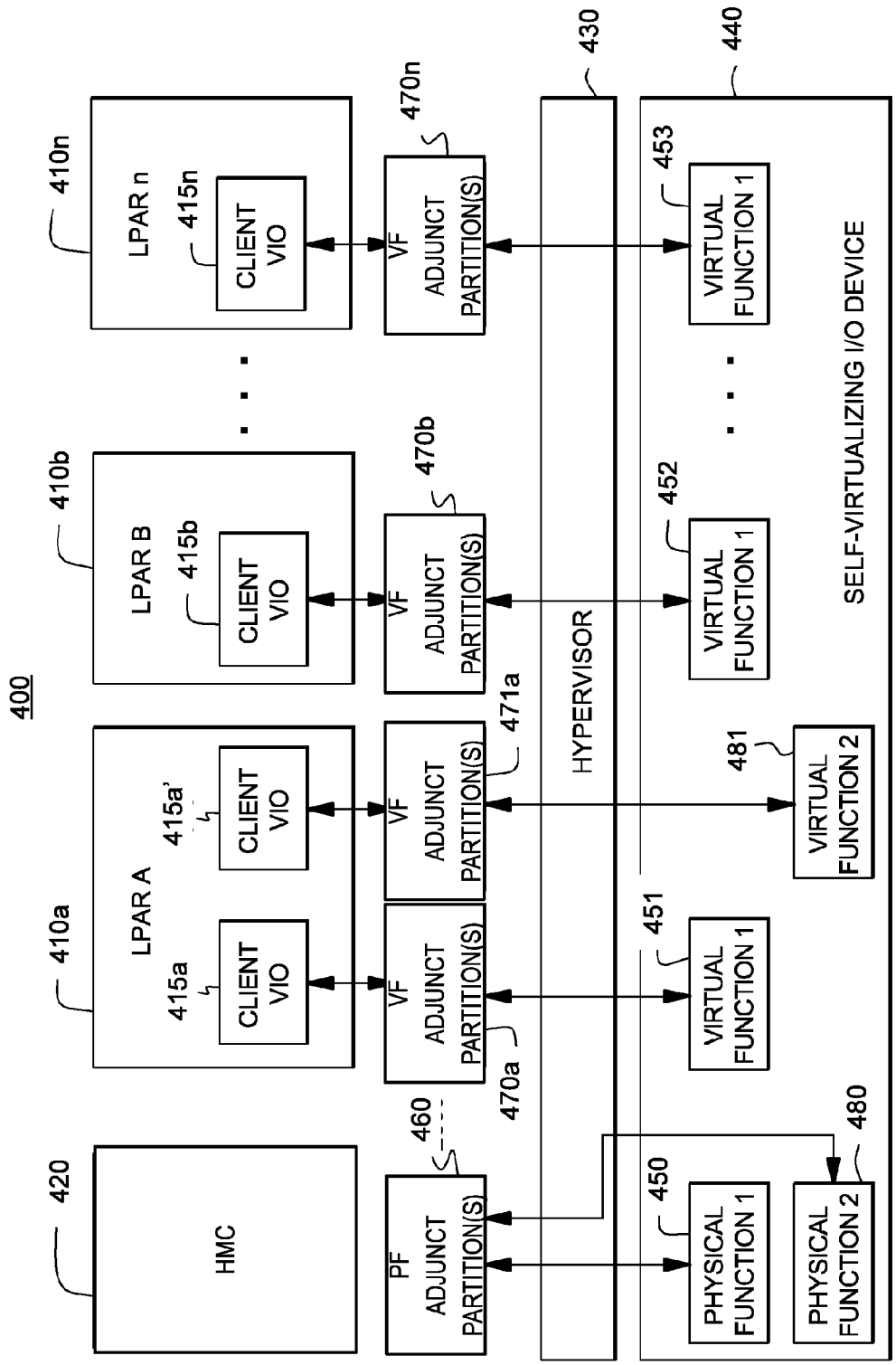
FIG. 4 illustrates one embodiment of a data processing system wherein multiple logical partitions are interfaced via device drivers within the multiple logical partitions to multiple virtual function instances of a self-virtualizing IO resource.

FIG. 4 depicts one embodiment of a data processing system, generally denoted 400, in accordance with an aspect of the present invention. Within data processing system 400, multiple logical partitions 410*a*, 410*b* . . . 410*n* run above a hypervisor 430, and provide higher-level function than that provided by the hypervisor. Hypervisor 430 executes on top of underlying system hardware, including a self-virtualizing input/output device (or adapter) 440, as well as one or more physical processors upon which the hypervisor runs. The self-virtualizing input/output device 440 is, in one embodiment, an input/output virtualization capable IO adapter. This adapter may present multiple virtual function instances 451, 452, 453 from a first physical function 450, each of which presents the functionality associated with a normal IO adapter. Further, in this embodiment, a second physical function 480 is depicted, from which a second virtual function 481 is provided, by way of example.

In addition, a hardware management console (HMC) 420 may be provided to enable user configuration of data processing system 400, e.g., by a systems administrator. HMC 420 may be implemented as an application executing on one or more physical processors in data processing system 400, or may be executed by one or more physical processors in a separate computer networked or otherwise interfaced with the data processing system.

Each virtual function is assigned to provide IO services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 470*a*, 471*a*, 470*b*, 470*n* are referred to as virtual function (VF) adjunct partitions due to the dedicated nature of the adjunct partitions to a particular logical partition to virtual function pairing. For all virtual functions associated with a same underlying hardware device, i.e., physical function 450 or physical function 480, the adjunct partition instances instantiated are the same. That is, each adjunct partition instance 470a, 470b . . . 470n is the same, while adjunct partition instantiation 471a is assumed to be different since it interfaces to a different virtual function 481, associated with a different physical function 480. Advantageously, by interjecting adjunct partitions between the logical partitions and the virtual functions, the input/output within each logical partition can be virtualized as a client virtual input/output (VIO) 415a, 415a', 415b . . . 415n.

By way of specific example, the underlying physical function might comprise a peripheral component interconnect (PCI) function that supports the single root IO virtualization capabilities (SRIOV) defined in the above-referenced "Single Root I/O Virtualization and Sharing Specification". The physical function would thus contain the SR-IOV capability structure. A virtual function is associated with the physical function, and shares one or more physical resources, such as a link, with the physical function and with other virtual functions that are associated with the same virtual function. A "function" means, in one embodiment, an addressable entity in configuration space associated with a single function number. A function may refer to one function in a multi-function device, or to the only function in a single-function device.

A physical function adjunct partition 460 is employed during initial configuration of the data processing system to facilitate setup of the virtual function adjunct partitions. Note that in the data processing system embodiment depicted in FIG. 4, multiple physical functions and multiple different virtual function instances are illustrated, two of which are accessed by a single logical partition via different virtual function adjunct partitions 470a, 471a. One, two or more than two physical functions may be implemented within the self-virtualizing input/output device, and each logical partition may access one or more of these physical functions via an associated virtual function of the device. Also, note that the client virtualized interfaces or drivers (client VIO 415a, client VIO 415a') within LPAR A 410a may be the same or different types of virtual interfaces or drivers, depending on the adjunct partition instances implemented for the particular logical partition to virtual function pairing.

The virtual function adjunct partitions 470a, 471a, 470b, 470n implement, in one embodiment, a server virtual adapter device driver, which interfaces with the respective client VIO within the associated logical partition, as well as a device driver for the virtual function on the self-virtualizing input/output device adapter. Each adjunct partition drives the respective virtual function on the adapter similar to the server virtual adapter device driver within a VIOS implementation. Creation of the adjunct partitions may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Those skilled in the art will note from the above discussion that the programming model described herein allows adjunct partition code developers to write code in a manner that allows typical operating system-kernel-code locking and synchronization primitives to be simplified or avoided. Adjunct partitions may be efficiently written as single-threaded polling state machines, and by controlling the degree of concurrency visible to a particular adjunct partition instance, it is possible to ensure that adjunct partition code may assume a runtime environment that is non-preemptive and single-threaded. For input/output processing work, there is little need for multiple threads to simultaneously execute to service a particular logical partition to virtual function pairing. These properties are feasible because each adjunct partition instance services a single logical partition to virtual function pairing in an isolated/protected environment (that is, a separate dispatchable state protected as described above), and adjunct partition instances can be deployed with overhead low enough to permit a single adjunct instance per logical partition to virtual function pairing, unlike a VIOS implementation.

Similarly, a data processing system similar to data processing system 400 may be utilized in connection with a self-virtualizing input/output device that utilizes a basic function and a queue structure virtualizable into multiple queue pairs. Each queue pair may be associated with the function, and may share one or more physical resources, such as a link, with the function and with other queue pairs that are associated with the same function. Multiple adjunct partitions may be employed to interface, for example, multiple logical partitions to respective queue pairs within the self-virtualizing input/output device, with a function adjunct partition employed during initial configuration of the data processing system to facilitate initial setup of the adjunct partitions. By providing an adjunct partition as an interface between each logical partition to queue pair pairing, a virtual input/output interface or driver can be employed within the respective logical partition. In this case, the logical partition is unaware of the actual type of hardware employed. The adjunct partition may include, for example, a server virtual device driver interfaced to a respective client VIO of the associated logical partition, as well as an appropriate physical adapter device driver for interfacing to the respective queue pair within the self-virtualizing input/output device.

Additional details regarding adjunct partitions are described in the aforementioned cross-referenced patents. In addition, various modifications to the adjunct partitions described herein will be appreciated by one of ordinary skill in the art having the benefit of the instant disclosure. Therefore, the invention is not limited to the particular adjunct partition implementations discussed herein.

Dynamic Sharing of Unused Bandwidth Capacity of Virtualized Input/Output Adapters As noted above SRIOV (Single Root IO Virtualization) is an IO virtualization technology developed by the PCI SIG (Special Interest Group) to virtualize PCIe adapters. An SRIOV-capable PCIe adapter generally can support multiple Physical Functions (PFs), and for each physical function, multiple Virtual Functions (VFs) may be created up to an implementation dependent maximum number. The virtual functions are generally assigned to various Virtual Machines (VMs) or Logical Partitions (LPARs) running on a Hypervisor or Virtual Machine Monitor (VMM).

In some conventional designs, virtual functions may be allocated fixed bandwidth resources from a physical function of an IO adapter based on user provided capacity or QoS (Quality of Service) settings, with the resources allocated to a virtual function fixed and dedicated to that virtual function over its lifetime. In general, the allocation of resources to virtual functions, however, may not be optimal as users may not be aware of application characteristics like bandwidth requirements, and because workloads may change over time and thereby change bandwidth requirements over time as well. As a result, over a period of time it generally may be observed that some virtual functions in a system may end up being over-utilized (e.g., due to insufficient IO bandwidth and/or adapter resources) while other virtual functions may end up being underutilized. Also, in some instances an IO adapter may be left with some amount of unused and/or unallocated IO resources of which users may not be aware.

One approach that could be taken to address the problems associated with fixed bandwidth allocations includes assigning each virtual function a small fixed bandwidth and allowing for the excess bandwidth to be shared across all virtual functions associated with the same physical function. Doing so would allow for bandwidth allocations to be better distributed across virtual functions when certain virtual functions are minimally used. However, such an approach generally would not allow for a user to assign a desired minimal bandwidth to a particular virtual function without taking those resources away from the excess bandwidth to be shared across virtual functions. Another approach includes reconfiguring virtual functions with new bandwidth allocations when a new level of bandwidth is required. Doing so would allow for bandwidth allocations to be adjusted to account for changes in virtual function usage; however, such an approach would generally require explicitly reconfiguring virtual functions and causing a disruption in service and additional manual or logic to determine when this reallocation should be done. Yet another approach includes simply acquiring and installing new hardware whenever it is determined that some of the applications in a data center are facing bandwidth bottle-necks. However, such an approach is often not economically feasible and may even be wasteful.

Embodiments consistent with the invention, in contrast with the aforementioned approaches, may dynamically optimize the use of IO adapter resources by intelligently sharing unused IO bandwidth of self-virtualizing IO resources such as SRIOV adapters based upon priorities assigned to one or more virtual functions in order to increase or otherwise improve the utilization of the bandwidth of IO resources accessed by a virtualization platform.

Embodiments consistent with the invention, for example, may assist in identifying the unused IO bandwidth of one or more self-virtualizing IO resources using a systematic method that allocates unallocated and/or allocated but otherwise available IO adapter Quality of Service (QoS) capacity by virtual functions belonging to active virtual machines supported by a virtualization platform, and based in part on priorities assigned to such virtual functions. As will become more apparent, in some embodiments of the invention, such a solution may be generally transparent to system administration, with a hypervisor dynamically detecting idle IO adapter resources and allocating the idle resources across running and/or active virtual machines, e.g., based on user assigned priorities for virtual machines and/or virtual functions.

For example, in some embodiments unused bandwidth capacity may be assigned to virtual functions in decreasing order of priority starting with a highest priority virtual function, first from unallocated bandwidth capacity and second from bandwidth capacity allocated but not being actively used by virtual functions in the allocation pool. Likewise, when bandwidth capacity may need to be reclaimed, e.g., in response to a request to create a new virtual function when insufficient unallocated bandwidth is available for a virtualized IO resource, previously-reallocated unused bandwidth capacity may be reclaimed from virtual functions in increasing order of priority starting with a lowest priority virtual function to which unused bandwidth capacity has been reallocated.

Furthermore, in some embodiments, the allocation of idle resources across running and/or active virtual machines may operate as an extension to a processor allocation model such as uncapped micro-partition processor allocations supported by the aforementioned PowerVM virtualization platform (although the invention is not limited to such a virtualization platform).

In one embodiment discussed in greater detail hereinafter, a number of attributes may be used by a hypervisor management application to implement dynamic bandwidth sharing in a manner consistent with the invention. In some embodiments, these attributes may be maintained by a hypervisor or other system entity in a virtualized platform and stored in non-volatile storage allocated for a virtual machine.

For example, one or more allocate unused bandwidth flags may be used to activate dynamic sharing at the virtual machine and/or virtual function levels. In one embodiment, an allocate unused bandwidth flag, also referred to herein as allocate_unused_qos, may be used to determine whether a particular virtual function will participate in dynamic sharing and be allocated additional bandwidth. Such an attribute may be user-configurable, and may be set, for example, when creating a virtual machine or virtual function, or alternatively at a later point in time. An allocate unused bandwidth flag may be associated with a virtual machine level and/or a virtual function level, and in some embodiments, separate virtual machine and virtual function allocate unused bandwidth flags may be supported.

In some embodiments, if the allocate unused bandwidth flag is set to TRUE at the virtual machine level, then this setting is applied to all virtual functions for the virtual machine unless overridden for a particular virtual function. If the allocate unused bandwidth flag is set to TRUE at the virtual function level, the setting is specific to that virtual function, and irrespective of any setting at the virtual machine level.

In addition, one or more priority attributes may be used to prioritize various virtual functions relative to other virtual functions when dynamically allocating unused bandwidth. Priority levels may generally include two or more levels, such that a priority attribute may be configured as a flag or may be configured as a numerical value or other indicator capable of enabling a determination to be made as to a priority of one entity relative to another entity.

For example, a virtual machine priority attribute, also referred to herein as vm_priority, may be user-configurable, and may provide a priority level applicable to all virtual functions for a virtual machine. Put another way, virtual functions in a virtual machine with a higher priority may be given preference when allocating unused bandwidth over virtual functions in a virtual machine with lower priority. A virtual function priority in physical function attribute, also referred to herein as vf_priority_in_pf, may be user-configurable, and may be applicable to a particular virtual function to provide a priority of the virtual function relative to other virtual functions sharing the same containing physical function. A virtual function priority in IO resource attribute, also referred to herein as vf_priority_in_adapter, may be user-configurable and applicable to a virtual function to provide a priority of the virtual function relative to other virtual functions in an entire IO resource, e.g., an SRIOV adapter. In some embodiments, this attribute may be used to influence the ability to use Virtual Ethernet Bridging (VEB) to share free adapter bandwidth across physical ports.

In addition, one or more additional capacity used attributes may be used to track the use of additional capacity by one or more entities, and may be maintained by a hypervisor or other system entity. For example, a virtual function additional capacity used in physical function attribute, also referred to herein as vf_additional_capacity_used_pf, may be used to track the amount of additional capacity used by a virtual function within its containing physical function. Likewise, a virtual function additional capacity used in IO resource attribute, also referred to herein as vf_additional_capacity_used_adapter, may be used to track the amount of additional capacity used by a virtual function within its IO resource, e.g., an SRIOV adapter.

It will be appreciated that different combinations of attributes may be used in different embodiments, so the invention is not limited to the particular attributes described herein.

As will become more apparent below, unused bandwidth may be shared based upon allocation pools of virtual functions. In some embodiments, the allocation pools may be based on physical function (or based on physical port), such that sharing is implemented between virtual functions contained by the same physical function or physical port. In some embodiments, the allocation pools may be based on IO resource, e.g., an SRIOV adapter, such that sharing is implemented between virtual machines of the same IO resource. In still other embodiments, sharing may be implemented at both the physical function level and the IO resource level, either at the same time or based on user selection.

From the perspective of the physical function level, sharing may be performed with consideration of priorities at both the virtual machine (vm_priority) and virtual function (vf_priority_in_pf) levels. As such, a user may be permitted to choose to prioritize at the virtual machine level (for example, a production virtual machine may have a higher priority than a test virtual machine) and at the virtual function level (e.g., so that a virtual function assigned to a critical application may have a higher priority than a virtual function assigned to a non-critical application). Each virtual function may be given a priority within its physical function (i.e., vf_priority_in_pf) during its creation time or at run time.

From the perspective of the IO resource level (i.e., across all ports/physical functions), sharing may utilize a VEB (Virtual Ethernet Bridge) implemented inside the IO resource, e.g., an SRIOV adapter. An advantage of sharing at the IO resource level is that additional bandwidth may be shared if a specific port has high utilization while another port has low utilization at a given time. Each virtual function may be given a priority within its IO resource (i.e., vf_priority_in_adapter) during its creation time or at run time.

Figure 5:
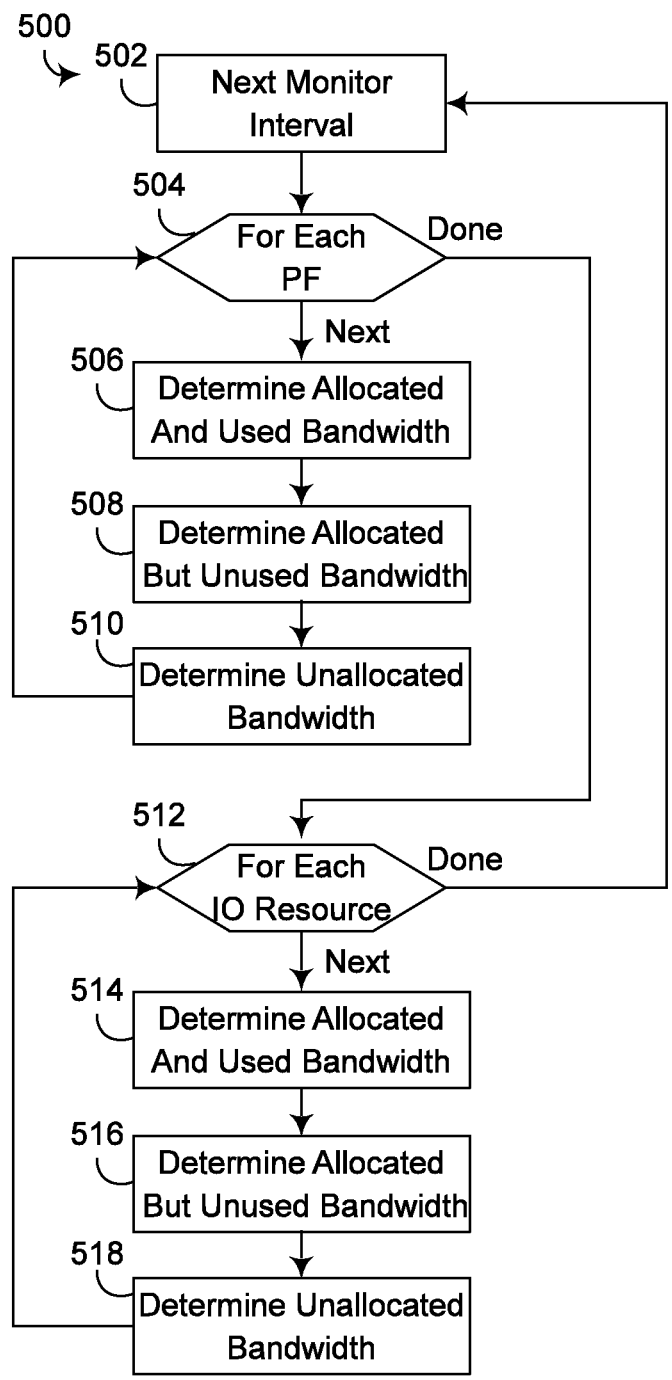
FIG. 5 is a flowchart illustrating an example sequence of operations for a monitor routine consistent with the invention.

In the illustrated embodiment, bandwidth monitoring is implemented within a hypervisor or other system entity. FIG. 5, for example, illustrates a monitoring routine 500 executed by a hypervisor. At each of a plurality of monitoring intervals (block 502), routine 500 initiates two FOR loops to determine a number of different bandwidth values at both the physical function and IO resource level. It will be appreciated that the monitoring may be performed in different routines at each level in some embodiments, and where bandwidth sharing is not supported at a particular level, the loop for that level may be omitted.

The first loop is initiated by block 504, and is used to determine IO bandwidth for three different IO pools. First, as determined in block 506, a physical function allocated and used bandwidth value (also referred to herein as pf_allocated_used_bandwidth_pool) represents the bandwidth allocated and actively being used by virtual functions of active/running virtual machines for a given physical function. As determined in block 508, a physical function allocated but unused bandwidth value (also referred to herein as pf_allocated_unused_bandwidth_pool) represents bandwidth that is allocated but unused (e.g., where a corresponding virtual machine and hence all of its virtual functions are in an inactive state) for a given physical function. As determined in block 510, a physical function unallocated bandwidth value (also referred to herein as pf_unallocated_bandwidth_pool) represents unallocated (or free) resources for a given physical function.

The second loop is initiated by block 512, and is used to determine IO bandwidth for three different IO pools. First, as determined in block 514, an adapter allocated and used bandwidth value (also referred to herein as adapter_allocated_used_bandwidth_pool) represents the bandwidth allocated and actively being used by virtual functions of active/running virtual machines for a given adapter. As determined in block 516, an adapter allocated but unused bandwidth value (also referred to herein as adapter_allocated_unused_bandwidth_pool) represents bandwidth that is allocated but unused (e.g., where a corresponding virtual machine and hence all of its virtual functions are in an inactive state) for a given adapter. As determined in block 518, an adapter unallocated bandwidth value (also referred to herein as adapter_unallocated_bandwidth_pool) represents unallocated (or free) resources for a given adapter.

Figure 6:
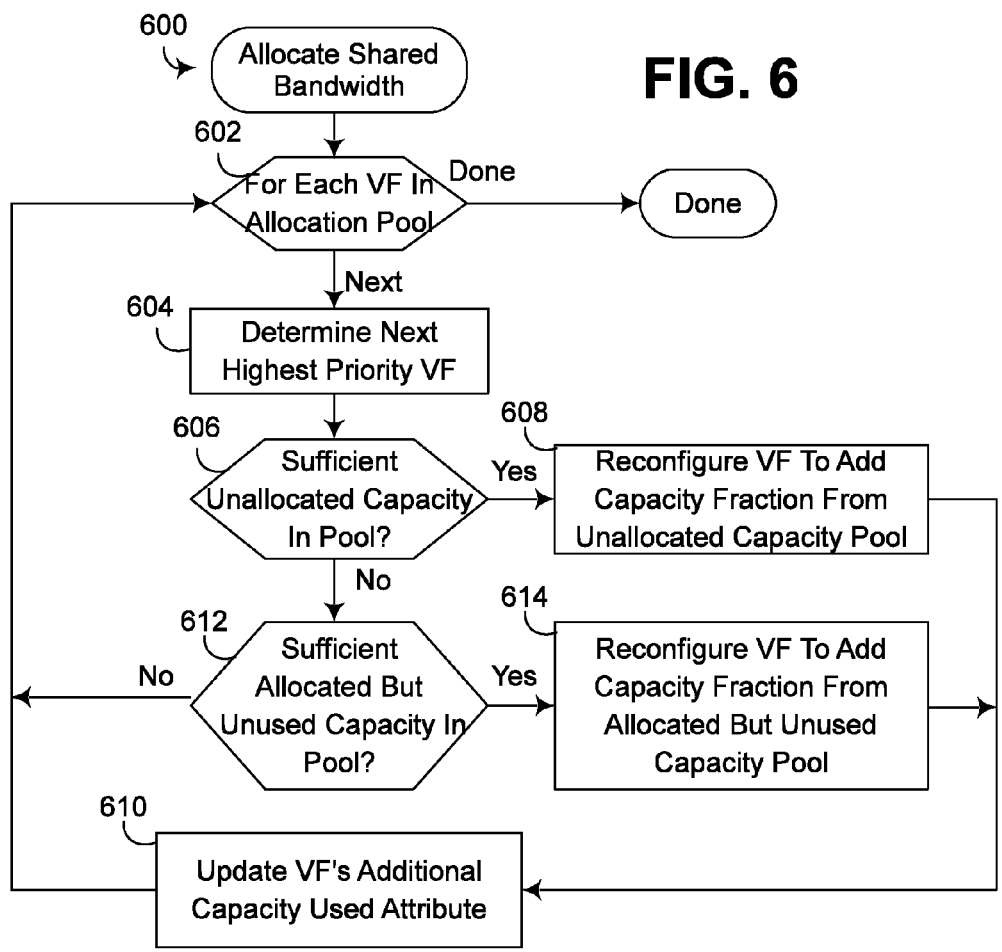
FIG. 6 is a flowchart illustrating an example sequence of operations for an allocate shared bandwidth routine consistent with the invention.

FIG. 6 next illustrates an allocate shared bandwidth routine 600 that may be executed by a hypervisor to allocate shared bandwidth in a given allocation pool (e.g., at the physical function or IO resource level). Routine 600 may be called, for example, at periodic intervals and/or in response to particular events, e.g., changes (additions/deletions/modifications) in the virtual functions of physical functions and/or IO resources, changes in assigned priorities, etc.

Routine 600 initiates a FOR loop in block 602 to process each virtual function in an allocation pool. For each such virtual function, block 604 selects a highest priority virtual function as the current virtual function, and then, based upon the aforementioned monitored bandwidth values, allocates unused bandwidth to the current virtual function. It will also be appreciated that block 604 may also select only from virtual functions that are activated for bandwidth sharing based upon an allocate unused bandwidth flag associated with the virtual function or its associated virtual machine.

Block 606 first determines if there is sufficient unallocated capacity in the allocation pool based upon the monitored unallocated bandwidth value. If so, control passes to block 608 to reconfigure the virtual function to add a capacity fraction from the unallocated capacity for the pool. The capacity fraction to be added may be determined in a number of manners. For example, the capacity fraction may be based on a fixed increase, e.g., give a fixed percentage of the unallocated capacity to each virtual function, and repeat the sequence until no more additional capacity exists. As another example, the capacity fraction may be priority weighted, e.g., give each virtual function a percentage equal to (priority/sum of all virtual function priorities) of the available unallocated capacity. As yet another example, the capacity fraction may be usage based, e.g., such that the fraction of unallocated capacity given to each virtual function is based on existing performance metrics such as actual usage, frames discarded due to timeouts, etc. Control then passes to block 610 to update the additional capacity added attribute for the virtual function, and control returns to block 602 to continue to process, in decreasing priority, the remaining virtual functions in the pool.

Returning to block 606, if there is insufficient unallocated capacity in the allocation pool, control passes to block 612 to determine if there is sufficient allocated but unused capacity in the allocation pool based upon the monitored allocated but unused bandwidth value. If so, control passes to block 614 to reconfigure the virtual function to add a capacity fraction from the allocated but unused capacity for the pool. Control then passes to block 610 to update the additional capacity added attribute for the virtual function, and control returns to block 602.

Returning to block 612, if there is insufficient allocated but unused capacity in the allocation pool, block 612 returns control directly to block 602. Once all virtual functions in the pool have been processed, routine 600 is complete.

As noted above, virtual functions may be prioritized in different manners in different embodiments, and as such, selection of a next highest priority virtual function in block 604 may differ in different embodiments. For example, in one embodiment each virtual function may have a priority attribute at the physical function and/or IO resource level, such that virtual functions may be selected in a decreasing order of the priority attributes associated with such virtual functions.

Thus, in one embodiment, from the perspective of the physical function level, the unused QoS in a physical function may be distributed across active/running virtual functions by a hypervisor or other system entity based on the assigned priorities (vf_priority_in_pf) of the virtual functions of the physical function in the following order. Virtual functions with higher priority may be assigned their capacity fraction from pf_unallocated_bandwidth_pool, e.g., by reconfiguring the virtual function with additional capacity based on its priority (i.e., vf_priority_in_pf). If there is no capacity available in pf_unallocated_bandwidth_pool, then QoS from pf_allocated_unused_bandwidth_pool may be allocated, e.g., by reconfiguring the virtual function with additional capacity based on its priority (i.e., vf_priority_in_pf). Thereafter, virtual functions with lower priority may be assigned their capacity fraction from unallocated bandwidth, if any. In addition, each virtual function's of additional_capacity_used_pf attribute may be updated with the amount of additional capacity assigned to that virtual function.

Likewise, from the perspective of the IO resource level, the unused QoS in an SRIOV adapter may be distributed across active/running virtual functions by a hypervisor or other system entity based on the assigned priorities (vf_priority_in_adapter) of the virtual functions of the SRIOV adapter in the following order. Virtual functions with higher priority may be assigned their capacity fraction from adapter_unallocated_bandwidth_pool, e.g., by reconfiguring the virtual function with additional capacity based on its priority (i.e., vf_priority_in_adapter). If there is no capacity available in adapter_unallocated_bandwidth_pool, then QoS from adapter_allocated_unused_bandwidth_pool may be allocated, e.g., by reconfiguring the virtual function with additional capacity based on its priority (i.e., vf_priority_in_adapter). Thereafter, virtual functions with lower priority may be assigned their capacity fraction from unallocated bandwidth, if any. In addition, each virtual function's vf_additional_capacity_used_adapter attribute may be updated with the amount of additional capacity assigned to that virtual function.

In some embodiments, when new requests for creation of virtual functions arrive for an IO resource such as an SRIOV adapter and there is no unallocated bandwidth available, a hypervisor or other system entity may reclaim the vf_additional_capacity_used_pf or of additional_capacity_used_adapter from virtual functions based on their decreasing order of priority, i.e., unused capacity assigned to lower priority virtual functions may be reclaimed first followed by higher priority virtual functions.

Figure 7:
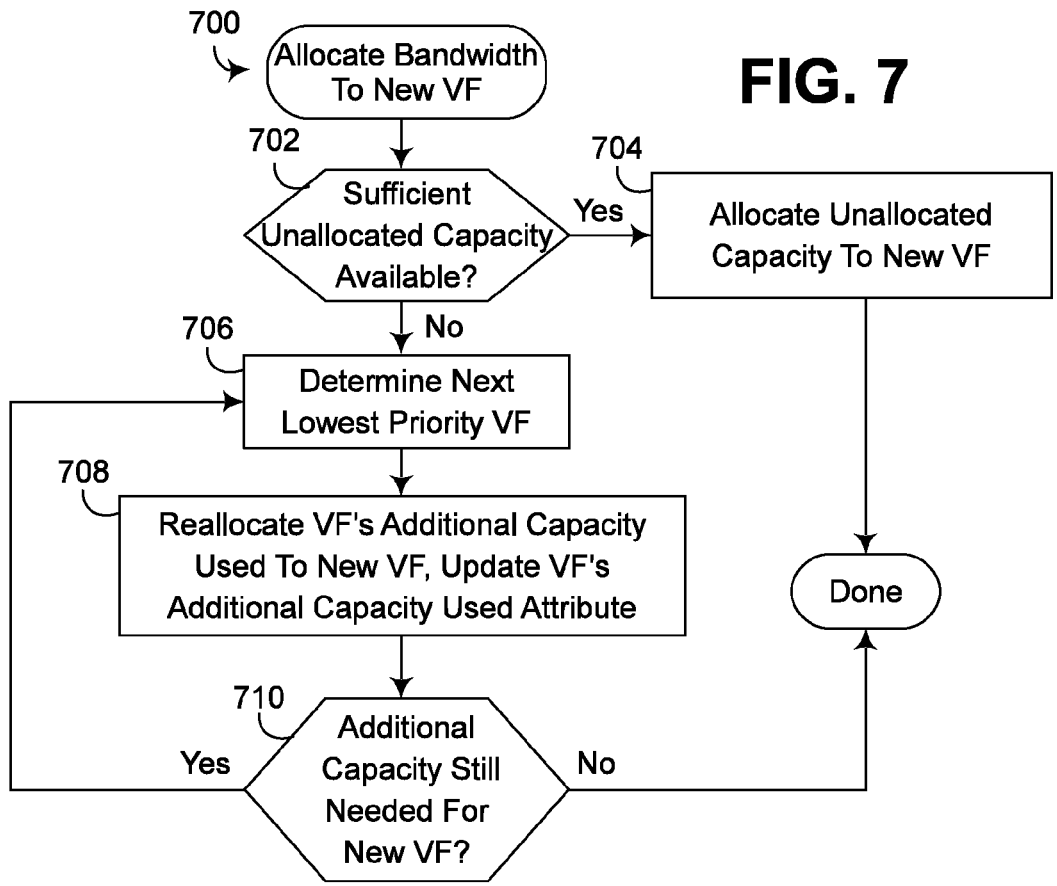
FIG. 7 is a flowchart illustrating an example sequence of operations for an allocate bandwidth to new virtual machine routine consistent with the invention.

For example, FIG. 7 illustrates an allocate bandwidth to new virtual function routine 700 that may be called, for example, in association with creating a new virtual function in an allocation pool (i.e., for the same physical function or IO resource). Routine 700 begins in block 702 by determining whether there is sufficient unallocated capacity available for the new virtual function. If so, control passes to block 704 to allocate unallocated capacity to the new virtual function in a conventional manner, and routine 700 is complete. Otherwise, block 702 passes control to block 706 to select the lowest priority virtual function as the current virtual function. Block 708 then reallocates the virtual function's allocated additional capacity (e.g., based on the additional capacity added attribute) to the new virtual function, and decreases the additional capacity added attribute for the current virtual function.

Block 710 next determines if additional capacity is still needed for the new virtual function after the reallocation in block 708. If not, routine 700 is complete. If so, control returns to block 706 to select the next lowest priority virtual function. Once sufficient capacity has been reallocated to the new virtual function, routine 700 is complete.

Figure 8:
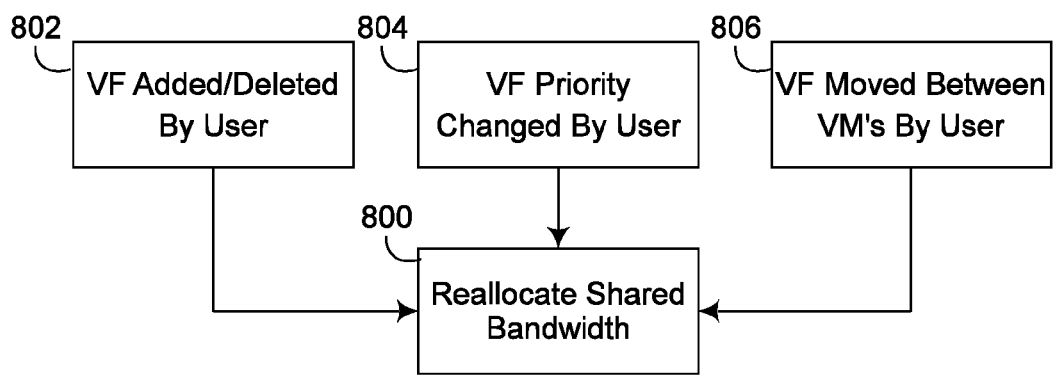
FIG. 8 is a block diagram illustrating several example triggering events for reallocating shared bandwidth in a manner consistent with the invention.

It will be appreciated that virtual function additional capacities may be dynamically updated in some embodiments, e.g., in response to various events, to reallocate bandwidth in a dynamic fashion at the physical function and/or IO resource levels. For example, as shown in FIG. 8, a reallocate shared bandwidth operation 800 (e.g., an operation that calls routine 600 of FIG. 6) may be initiated in response to various events represented by blocks 802-806.

For example, as shown in block 802, when new virtual functions are added or existing virtual functions are deleted by users, a management console may send requests to a hypervisor. The hypervisor may then process those requests and update unallocated/allocated but unused bandwidth pools for physical functions or IO resources dynamically. As another example, as shown in block 804, priority values for virtual functions and/or virtual machines may be changed by users at run time to adjust the bandwidth for their workloads. As another example, as shown in block 806, when a virtual function is moved from one virtual machine to another virtual machine in the same hypervisor, virtual machine priority may change, thereby triggering a change in the values of vf_additional_capacity_used_pf and of additional_capacity_used_adapter for the affected virtual function.

While the herein-described techniques may be implemented in various virtualization platforms, in one embodiment, a PowerVM virtualization platform may implement the herein-described techniques in the following manner. A Hardware Management Console (HMC) application, for example, may be enhanced to support management of the following attributes:

allocate_unused_qos: This attribute is set by a user and determines whether a particular virtual function will be allocated additional bandwidth. While creating a virtual machine or virtual function, this new attribute may be set to TRUE or FALSE at the virtual machine or virtual function level. If allocate_unused_qos=TRUE at the virtual machine level then this is applicable for all virtual functions assigned to it unless it is turned off for a particular virtual function. If allocate_unused_qos=TRUE at the virtual function level then for that virtual function alone this attribute is applicable irrespective of its value at the virtual machine level.

vm_priority: This priority attribute may be set by a user and is applicable to all virtual functions in a virtual machine, i.e., while sharing unused bandwidth, virtual functions in a virtual machine with higher priority may be given preference over virtual functions in a virtual machine with lower priority.

vf_priority_in_pf: This priority attribute may be set by a user and is applicable to a virtual function. This priority indicates the priority of a virtual function within its containing physical function.

vf_priority_in_adapter: This priority attribute may be set by a user and is applicable to a virtual function. This priority indicates the priority of a virtual function in a whole adapter. This priority may influence the ability to use Virtual Ethernet Bridging (VEB) to share free adapter bandwidth across physical ports.

vf_additional_capacity_used_pf: This attribute may be maintained by an SRIOV adjunct partition and may represent the amount of additional capacity used by a virtual function in its physical function.

vf_additional_capacity_used_adapter: This attribute may be maintained by an SRIOV adjunct partition and may represent the amount of additional capacity used by a virtual function in its SRIOV adapter.

In addition, the first four attributes mentioned above may be stored in the Flexible Service Processor (FSP) Non-Volatile storage for each virtual machine on a CEO, while the last two attributes (vf_additional_capacity_used_pf and vf_additional_capacity_used_adapter) may be updated in NVRAM based on notifications from an SRIOV adjunct partition when there is a change (e.g., addition/deletion) in additional capacity usage for a virtual function.

Further, in the PowerVM virtualization platform, an adjunct partition (a hidden partition) may be considered to own an SRIOV adapter (in shared mode) and may be used to manage the allocation and deallocation of bandwidth resources to virtual functions. An HMC may communicate with an SRIOV adjunct partition through the hypervisor for any configuration requests (CreateVF, DeleteVF, ModifyVF etc.). An adjunct partition may be enhanced in the following manner to support the herein-described techniques.

First, an SRIOV adjunct partition may maintain the virtual machine priority attribute (vm_priority) and virtual function priority attributes (vf_priority_in_pf and vf_priority_in_adapter) for each virtual function in its cache (e.g., scratch pad registers) at run time. These values may be passed to the adjunct partition by the hypervisor during adjunct partition boot or during configuration requests (e.g., CreateVF, DeleteVF, ModifyVF, etc.)

Second, an SRIOV adjunct partition may keep track of IO bandwidth for the SRIOV adapter (owned by it) under the three different pools mentioned above. These pools may be maintained as in-memory data structures.

Third, based on the assigned priorities of virtual functions (vf_priority_in_pf and vf_priority_in_adapter), the unused QoS within the physical function and on the adapter may be distributed across active/running virtual functions.

Fourth, each virtual function's additional capacity attributes (vf_additional_capacity_used_pf and of additional_capacity_used_adapter) may be updated accordingly. If there is any change, an event notification may be sent to the hypervisor so that the NVRAM may be updated with the latest values for the affected virtual functions and virtual machines.

Fifth, when requests for creation of new virtual functions arrive for the SRIOV adjunct partition and there is no unused bandwidth available, the adjunct partition may reclaim the additional capacity from virtual functions as mentioned above.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of allocating shared bandwidth of a virtualized input/output (IO) resource in a logically-partitioned computer, the method comprising:
   determining unused bandwidth capacity for an allocation pool that includes a plurality of virtual functions of the virtualized IO resource, wherein each of the plurality of virtual functions includes a priority associated therewith, wherein the virtualized IO resource comprises a self-virtualizing IO resource and includes one or more physical functions and multiple virtual functions contained by and sharing bandwidth resources of the one or more physical functions, and wherein the plurality of virtual functions are from among the multiple virtual functions of the virtualized IO resource; and
   using at least one physical processor, reallocating the unused bandwidth capacity to at least one of the plurality of virtual functions in the allocation pool as additional bandwidth capacity based upon the priority associated with the at least one of the plurality of virtual functions.

2. The method of claim 1, wherein the unused bandwidth capacity includes unallocated bandwidth capacity and allocated but not being actively used bandwidth capacity.

3. The method of claim 2, wherein determining the unused bandwidth capacity for the allocation pool includes:
   monitoring bandwidth capacity allocated and actively being used by virtual functions in the allocation pool;
   monitoring bandwidth capacity allocated but not being actively used by virtual functions in the allocation pool; and
   monitoring unallocated bandwidth capacity for the allocation pool.

4. The method of claim 3, wherein monitoring bandwidth capacity allocated but not being actively used by virtual functions in the allocation pool includes determining bandwidth capacity allocated to virtual functions associated with inactive virtual machines.

5. The method of claim 3, wherein reallocating the unused bandwidth capacity to the least one virtual function includes assigning the unused bandwidth capacity to virtual functions in decreasing order of priority starting with a highest priority virtual function first from the unallocated bandwidth capacity and second from the bandwidth capacity allocated but not being actively used by virtual functions in the allocation pool.

6. The method of claim 1, wherein the allocation pool is associated with a physical function among the one or more physical functions of the virtualized IO resource, wherein the plurality of virtual functions are contained by the physical function, and wherein reallocating the unused bandwidth capacity includes sharing the unused bandwidth capacity of the physical function between at least two virtual functions contained by the physical function.

7. The method of claim 1, wherein the allocation pool is associated with the virtualized IO resource, wherein the virtualized IO resource includes a virtual Ethernet bridge (VEB), wherein the plurality of virtual functions are of the virtualized IO resource, and wherein reallocating the unused bandwidth capacity includes sharing the unused bandwidth capacity of the virtualized IO resource between at least two virtual functions of the virtualized IO resource using the VEB.

8. The method of claim 1, wherein the priority associated with the at least one virtual function is defined by a virtual machine priority attribute for a virtual machine with which the at least one virtual function is associated, the virtual machine priority attribute being user configurable and applicable to all virtual functions for the virtual machine.

9. The method of claim 1, wherein the priority associated with the at least one virtual function is defined by a priority in physical function attribute, the priority in physical function attribute being user configurable to prioritize the at least one virtual function relative to other virtual functions contained by the same physical function among the one or more physical functions in the virtualized TO resource.

10. The method of claim 1, wherein the priority associated with the at least one virtual function is defined by a priority in TO resource attribute, the priority in TO resource attribute being user configurable to prioritize the at least one virtual function relative to other virtual functions of the virtualized TO resource.

11. The method of claim 1, further comprising updating an additional capacity used attribute for the at least one virtual function to track an amount of additional capacity reallocated to the at least one virtual function.

12. The method of claim 1, further comprising, in response to a request to create a new virtual function when insufficient unallocated bandwidth is available for the virtualized TO resource, reclaiming reallocated unused bandwidth capacity from virtual functions in the allocation pool in increasing order of priority starting with a lowest priority virtual function to which unused bandwidth capacity has been reallocated.

13. The method of claim 1, wherein reallocating the unused bandwidth capacity to the at least one virtual function includes determining whether an allocate unused bandwidth flag is set for the at least one virtual function or a virtual machine with which the at least one virtual function is associated.

14. The method of claim 1, wherein reallocating the unused bandwidth capacity to the at least one virtual function is performed in response to creation or deletion of a virtual function in the allocation pool.

15. The method of claim 1, wherein reallocating the unused bandwidth capacity to the at least one virtual function is performed in response to changing a priority of at least one virtual function in the allocation pool.

16. The method of claim 1, wherein reallocating the unused bandwidth capacity to the at least one virtual function is performed in response to moving at least one virtual function in the allocation pool between virtual machines.

17. The method of claim 1, wherein reallocating the unused bandwidth capacity to the at least one virtual function is performed by a hypervisor or an adjunct partition.

18. The method of claim 1, wherein the virtualized IO resource comprises a single root input output virtualization (SRIOV) adapter.

* * * * *